June 12, 1934.      R. K. LEE      1,962,746
VIBRATION DAMPER
Filed June 27, 1929

INVENTOR
ROGER K. LEE.
BY
Irving Harness
ATTORNEY

Patented June 12, 1934

1,962,746

UNITED STATES PATENT OFFICE 1,962,746

VIBRATION DAMPER

Roger K. Lee, Detroit, Mich., assignor to Chrysler Corporation, Detroit, Mich., a corporation of Delaware Application June 27, 1929, Serial No. 374,022

7 Claims. (Cl. 74—6)

This invention relates to torsional vibration dampers for internal combustion motors.

The main objects of this invention are to provide an improved vibration damper, particularly suitable for use on automobile engines of the internal combustion type; to provide a vibration damper which decreases the amplitude of the vibration by means of counter-acting forces as distinguished from dampers which accomplish this object by the absorption of energy through frictional means; to provide a vibration damper in which a thin sleeve of rubber is vulcanized to the inner member or hub and to an outer relatively thin metal sleeve; to provide a vibration damper which can be readily accommodated to various sizes and types of internal combustion motors by means of detachable inertia rings of various sizes; to provide improved means for attaching or securing the vibration damper on the end of a crankshaft, and for securing the crank jaw thereon independently of the crankshaft and vibration damper.

An illustrative embodiment of this invention is shown in the accompanying drawing, in which.

Figure 1:
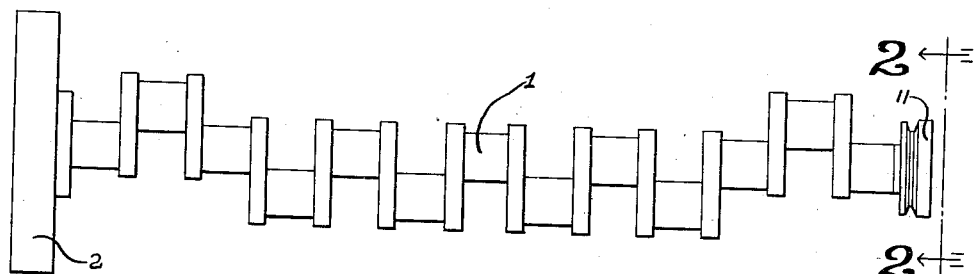
Fig. 1 is a view of a six throw crankshaft provided with one of my improved vibration dampers on the forward end thereof.
Figure 3:
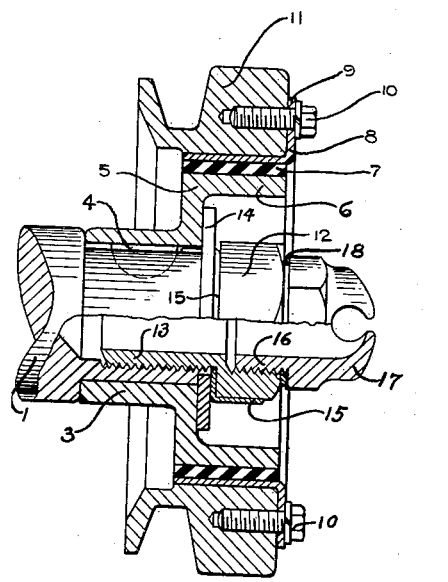
Fig. 3 is an enlarged sectional view taken on the line 3—3 of Fig. 2.
Figure 2:
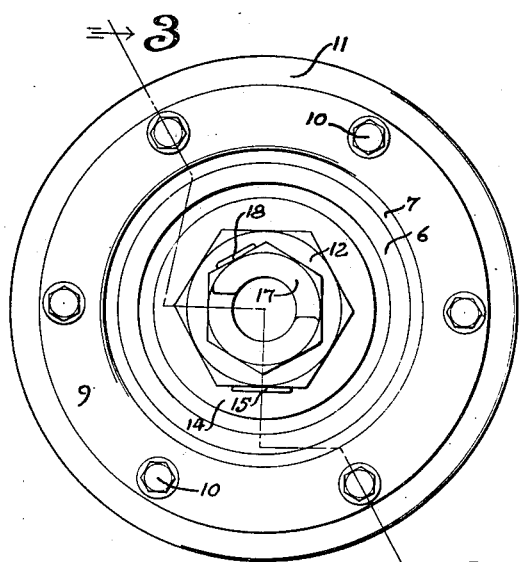
Fig. 2 is an enlarged view of the face of the vibration damper as taken on the line 2—2 of Fig. 1.

In the construction shown in the drawing, a six throw crankshaft 1 of usual construction is shown provided at one end thereof with a flywheel 2 rigidly keyed thereon. The opposite end of the crankshaft is provided with my improved vibration damper, which comprises a hub member 3 rigidly secured by a key 4 from turning relatively to the shaft. The hub 3 has a radially extending flange 5 integrally formed thereon at the forward end thereof and an axially extending flange 6 integrally formed on the outer periphery of the flange 5.

The flange 6 is of annular construction and the outer surface thereof has a relatively thin sleeve of yieldable material, such as rubber 7 vulcanized thereto so that surface adhesion secures the rubber tightly to the outer surface of the flange 6.

The sleeve of rubber 7 is surrounded in concentric relation by a thin relatively light weight metal sleeve 8, which is also secured by the vulcanization of the rubber sleeve 7.

The sleeve 8 is provided at one end thereof with a radially extending flange 9 which has a series of equi-distantly spaced apertures therethrough for receiving studs 10. The sleeve 8 and flange 9 serve as a mounting for an inertia ring 11 which is securely held thereon by the threaded studs 10. These inertia rings 11 may be of varying sizes and weights so as to properly dampen the vibration for different sized internal combustion motors.

Means are provided for securing the vibration damper on the end of the crankshaft, and comprise a hollow nut 12, which has an externally threaded shank 13 of reduced size thereon. The end of the crankshaft 1 is provided with an axial bore which is interiorly threaded for receiving the shank 13. A relatively heavy washer 14 is interposed between the nut 12 and the outer face of the flange 5 and a lock washer 15 is interposed between the washer 14 and the nut 12 for preventing the unscrewing of the nut. A tongue on the lock washer extends into the keyway for the key 4 so as to prevent relative rotation between said lock washer and the shaft.

The outer end of the hollow nut 12 is interiorly threaded to receive the threaded shank 16 of a crank jaw 17 and a lock washer 18 is interposed underneath the crank jaw for preventing it becoming accidentally unscrewed when in use.

As is generally well known, torsional vibration in a crankshaft can be damped by either the absorption of energy by friction, or by the employment of counteracting forces, as disclosed in the application of Roger K. Lee, Serial No. 285,721, filed June 15, 1928.

In the operation of this device, an inertia ring 11 of suitable size and weight for the particular engine is secured by the studs 10 to the sleeve 8. The assembled device is then placed on the end of a crankshaft and secured thereto by the key 4 and nut 12.

Due to the thinness of the outer sleeve 8, the rubber can be uniformly and very successfully vulcanized to the parts, and by having the inertia ring 11 detachably attached to this outer sleeve, various sized rings may be placed thereon for various sized engines.

Due to the rubber connection between the outer inertia ring and the rigidly mounted hub of the device, the outer ring will tend to have a constant and uniform rate of rotation. Due to the uniformly rotating inertia ring, the amplitude of torsional vibrations set up in the crankshaft will be decreased so that their manifestations will not be objectionable in the operation of a motor.

Although but one specific embodiment of this invention has been herein shown and described, it will be understood that numerous details of the construction shown may be altered or omitted, without departing from the spirit of this invention as defined by the following claims.

What I claim is:

1. A vibration damper comprising an inner member adapted to be secured to a crankshaft, a sleeve in spaced relation to said inner member, yieldable material in said space secured to said sleeve and inner member, an inertia ring surrounding said sleeve, and means on said sleeve rigidly fixed to said inertia ring.

2. A vibration damper comprising an inner member adapted to be secured to a crankshaft, a sleeve in spaced relation to said inner member having a radially extending flange, yieldable material in said space secured to said sleeve and inner member, and an inertia ring secured to said sleeve.

3. A vibration damper comprising a hub securable to a crankshaft, a sleeve surrounding said hub in spaced relation thereto, a radially extending flange on said sleeve, rubber vulcanized between said sleeve and hub and bonded thereto, and an inertia ring secured to said sleeve flange.

4. In a vibration damper of the class described, a rotatable member, a sleeve member surrounding said rotatable member in spaced relation thereto, a rubber member in said space between the adjacent surfaces of said members, an inertia member surrounding said sleeve, and means on said sleeve for rigidly fixing said inertia ring thereto.

5. A vibration damper comprising a hub securable to a crankshaft, an inertia ring surrounding said hub in spaced relation thereto, a rubber connecting member located in the space between said hub and ring having a rigid element vulcanized thereon, said member being vulcanized to said hub, and means detachably securing said rigid element to said ring.

6. A vibration damper comprising a member securable to a crankshaft and having an outer periphery of substantial width, an inertia ring having a peripheral portion registering with the outer periphery of said member and spaced relative thereto, yieldable material in said space and secured to said member, and a rigid element secured to said yieldable member having a connecting element rigidly fixed to said inertia ring.

7. In combination, a shaft, a vibration damper including a member secured to the shaft having at least one relatively broad face, a second member having a relatively broad face opposed to the first said broad face, yieldable material disposed between said faces and bonded thereto, an inertia member adjacent said second member, and means on said second member for rigidly fixing said inertia member thereto.

ROGER K. LEE.